United States Patent [19]
Mochizuki

[11] Patent Number: 5,495,778
[45] Date of Patent: Mar. 5, 1996

[54] AUTOMOTIVE AUTOMATIC TRANSMISSION STRUCTURE

[75] Inventor: Akira Mochizuki, Shizuoka, Japan

[73] Assignee: Jatco Corporation, Fuji, Japan

[21] Appl. No.: 307,094

[22] Filed: Sep. 16, 1994

Related U.S. Application Data

[63] Continuation of Ser. No. 944,174, Sep. 11, 1992, abandoned.

[30] Foreign Application Priority Data

Sep. 13, 1991 [JP] Japan .................................. 3-234698

[51] Int. Cl.$^6$ .................................................. F16H 57/02
[52] U.S. Cl. ....................... 74/606 R; 475/285; 475/284; 475/325
[58] Field of Search ........................... 74/606 R; 475/284, 475/285, 313, 225, 339, 340

[56] References Cited

U.S. PATENT DOCUMENTS

| | | | |
|---|---|---|---|
| 2,862,403 | 12/1958 | Miller | 475/285 X |
| 3,053,117 | 9/1962 | Hensel | 475/284 |
| 3,541,887 | 11/1970 | Van Lent et al. | 475/285 X |
| 3,613,481 | 10/1971 | Lapinski | 74/606 R |
| 4,736,653 | 4/1988 | Hayakawa et al. | 74/606 R X |
| 4,823,641 | 4/1989 | Kuhn | 74/760 |
| 5,087,231 | 2/1992 | Yamaguchi et al. | 74/606 R X |
| 5,105,686 | 4/1992 | Onuma et al. | 74/606 R |
| 5,152,190 | 10/1992 | Jürgens et al. | 74/606 R |
| 5,188,575 | 2/1993 | Leising et al. | 475/284 X |

FOREIGN PATENT DOCUMENTS

| | | | |
|---|---|---|---|
| 0246511 | 11/1987 | European Pat. Off. | 475/325 |
| 376283 | 7/1990 | European Pat. Off. | 74/606 R |
| 3613331 | 11/1986 | Germany | 74/760 |
| 47-29221 | 8/1972 | Japan | 475/284 |
| 52-19860 | 2/1977 | Japan | 475/285 |
| 52-67451 | 6/1977 | Japan | 475/285 |
| 61-31765 | 2/1986 | Japan | 74/606 R |
| 61-82070 | 4/1986 | Japan | 74/606 R |
| 61-157873 | 7/1986 | Japan | 74/606 R |
| 61-153061 | 7/1986 | Japan | 74/606 R |
| 1-312267 | 12/1989 | Japan | 74/606 R |
| 4-136548 | 5/1992 | Japan | 475/285 |

OTHER PUBLICATIONS

Toyota A240 Automatic Transmission Shuurisho (Repair Manual), Dec. 1986, pp. 3–4, published by Toyota Motor Co., Ltd.

Toyota Model A140 and Mode A141, Automatic Transmission Repair Manual, May 24, 1985, pp. 3–7 and 3–8 published by Toyota Motor Co. Ltd.

Electronically Controlled 4-Speed Automatic Transmission, 1984, pp. 1–2.

*Primary Examiner*—Vinh T. Luong
*Attorney, Agent, or Firm*—Foley & Lardner

[57] ABSTRACT

In an automatic transmission a low and reverse brake is arranged at an end portion of a transmission casing spaced from an inner surface of a side cover of the transmission. A cylinder chamber for receiving a piston of the low and reverse brake is formed integrally with the side cover as well as a second chamber, radially inward of the cylinder chamber for accommodating a clutch drum of a high clutch mounted proximate the low and reverse brake.

3 Claims, 8 Drawing Sheets

FIG.3

|  | REV/C | HIGH/C | LOW/C | L&R/B | LOW O.W.C | BAND/B |
|---|---|---|---|---|---|---|
| 1st |  |  | ○ | ○ | ◍ |  |
| 2nd |  |  | ○ |  |  | ○ |
| 3rd |  | ○ | ○ |  |  |  |
| 4th |  | ○ |  |  |  | ○ |
| REV | ○ |  |  | ○ |  |  |

AUTOMOTIVE AUTOMATIC TRANSMISSION STRUCTURE

This application is a continuation, of application Ser. No. 07/944,174, filed Sep. 11, 1992 now abandoned.

BACKGROUND OF THE INVENTION

1. Field of the Invention

The present invention relates generally to an automatic transmission arrangement for automotive vehicles. Particularly, the present invention relates to an automotive automatic transmission in which efficient use of space is utilized for reducing a necessary size of the transmission.

2. Description of the Prior Art

Conventionally, in an automotive automatic transmission, a hydraulically operated mechanism is arranged in an end portion thereof. For example, a multi-plate type brake utilizing a plurality of clutch plates, a piston and a return spring may be arranged in an end portion of the transmission casing or at a side cover portion of the transmission.

For example, in Toyota A240 Automatic Transmission Shuurisho (Repair Manual) pg. 3–4 (Published December, 1986 by Toyota Motors Co. Ltd.) such type of automatic transmission is disclosed in which a piston and a return spring are accommodated in a cylinder chamber provided at and end portion of the transmission casing. The cylinder chamber is connected with a multiplate clutch provided in a central portion of the transmission casing.

Further, in Toyota Model A140 and Model A141, Automatic Transmission Repair Manual, pgs. 3–7 and 3–8 respectively (Published May 24, 1985 by Toyota Motors Co. Ltd.), as well as Mitsubishi Automatic Transmission KM170, KM171, KM172 and KM175 Complete Equipment Manual (Seibi Kaisetsusho), pg. 5 (Published October 1983 by Mistusbishi Motors Co. Ltd.) automatic transmissions are disclosed in which a cylinder chamber accommodates a return spring. A vertical wall portion is formed at the side cover of the transmission and clutch plates are arranged between the wall and the cylinder chamber.

In the above-mentioned prior art automatic transmissions it is required that a vertical wall portion be provided in the transmission casing either at the side cover or within the casing itself. Transmission structures requiring such a wall portion cause an axial measurement thereof to be increased.

Also, according to the above-mentioned prior art automatic transmissions, since the hydraulically operated clutch, or brake must be installed followed by installation of the side cover over the open end of the transmission casing, to manufacturing steps are required at this stage, increasing the cost and complexity of manufacturing an automatic transmission.

In modern automotive technology, a compact transmission with reduced axial length has been required.

SUMMARY OF THE INVENTION

It is therefore a principal object of the present invention to overcome the drawbacks of the prior art.

It is a further object of the present invention to provide an automatic transmission which may be designed to be compact and shorter in an axial dimension than conventional automatic transmissions and in which the manufacturing steps therefore may be simplified.

In order to accomplish the aforementioned and other objects, an automatic transmission is provided, comprising: a transmission casing open at one end thereof; a cover closing the transmission casing at the open end; a hydraulically operated brake mechanism arranged in an end portion of the transmission casing proximate the open end, the brake mechanism including a first plate member connected to the transmission case and second plate member connected to a rotatable member disposed within the transmission casing the first and second plate members operable to engage or disengage each other according to movement of a hydraulically operated piston; and a cylinder chamber receiving the piston, the cylinder chamber being formed on an inner surface of the cover portion.

BRIEF DESCRIPTION OF THE DRAWINGS

In the drawings:

FIG. 3 is a chart showing clutch and brake engagement in relation to transmission gear;

DESCRIPTION OF THE PREFERRED EMBODIMENT

Figure 1:
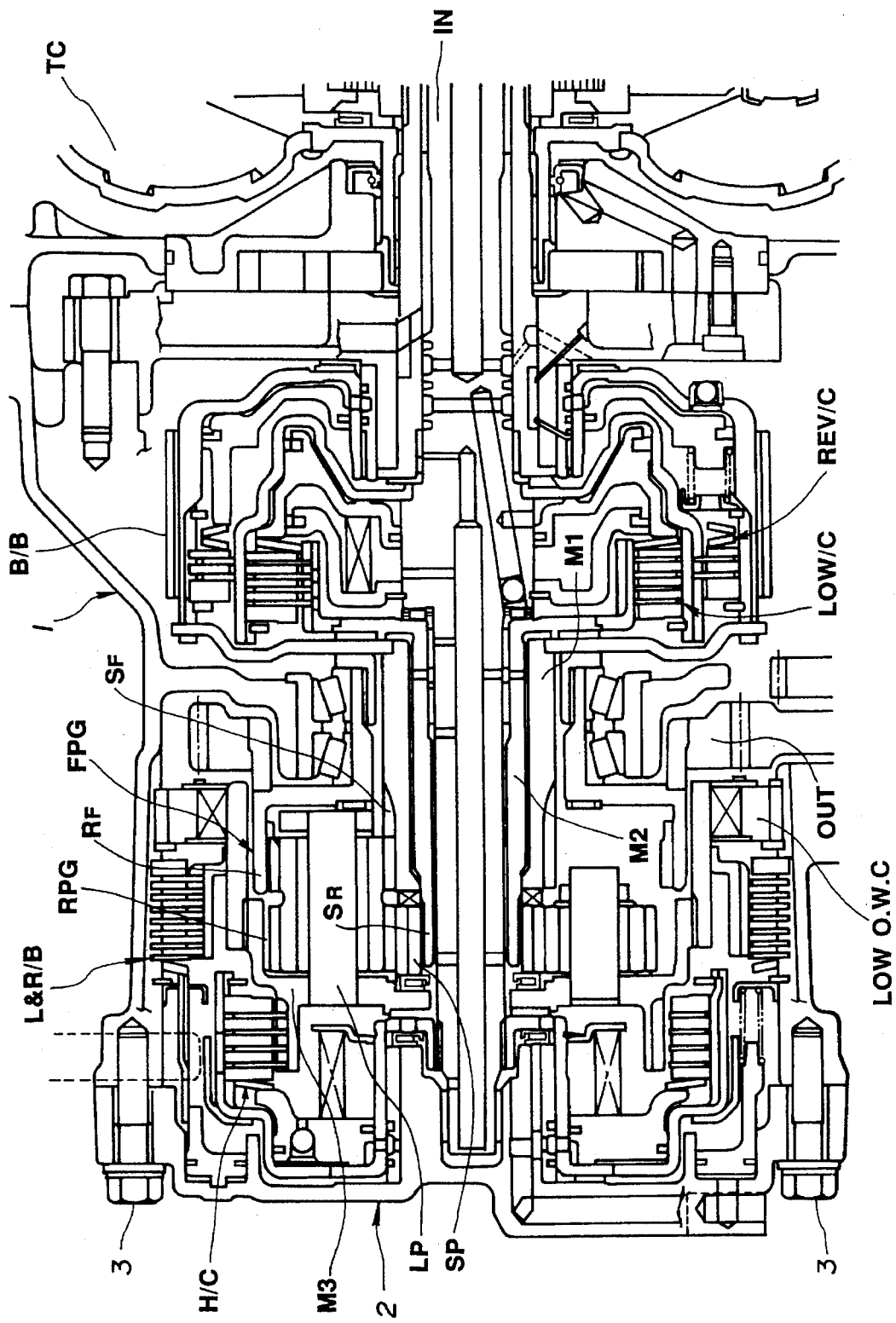
FIG. 1 is a cross-sectional view of an automatic transmission according to the invention.

Referring now to the drawings, particularly to FIG. 1, an automatic transmission includes a torque converter TC, a transmission casing 1, and a side cover 2. Further, the side cover 2 is attached to the transmission casing 1 by a plurality of bolts 3.

In addition, the automatic transmission has an input shaft IN, and an output gear OUT. Arranged between the input shaft IN and the output gear OUT, a forward planet gear FPG and a reverse planet gear RPG, are provided for achieving four forward driving speeds and one reverse speed. For engine braking control, a reverse clutch REV/C, a band brake B/B, a low clutch LOW/C, a low and reverse brake L&R/B, a high clutch H/C, a low one-way clutch LOW O.W.C are provided and, connected to the input shaft IN and the output gear OUT, rotatable members M1, M2 and M3 are provided.

The above-mentioned forward and reverse planet gears FPG and RPG are arranged in one planetary gear set. The third rotatable member M3 supports a short pinion SP and a long pinion LP so as to be freely rotatable. The forward planet gear FPG engages the long pinion LP and a forward sun gear SF and a forward ring gear RF engages the output gear OUT. Further, the reverse planet gear RPG engages the short pinion SP and a reverse sun gear Further to say, the above-mentioned first rotatable member engages the forward sun gear SF and the second rotatable member engages the reverse sun gear SR. The reverse clutch REV/C engages the first rotatable member M1 with the input shaft IN in an interruptable fashion, and the band brake B/B interruptably connects the first rotatable member M1 with the transmission casing 1.

The low clutch LOW/C interruptably connects the second rotatable member M2 with the input shaft IN.

The low and reverse brake L&R/B and the low one-way clutch LOW O.W.C are arranged adjacently and may interruptably connect the third rotatable member M3 with the transmission casing 1, and the high clutch H/C interruptably connects the third rotatable member with the input shaft IN.

Hereinbelow the structure of the embodiment will be explained in detail with reference to the enlarged cross-sectional diagram of FIG. 2.

The side cover 2 has a support portion 2a, for supporting a clutch drum 4a of the high clutch H/C, and a cylinder chamber 2b, the cylinder chamber 2b is formed radially outward of the support portion 2a. The accommodating portion 2a supports the piston 4b of the high clutch drum 4a in relatively rotatable fashion.

The low and reverse brake L&R/B includes brake plates 5a and 5b, a piston 5c and a return spring 5d. In the low and reverse brake L&R/B, both brake plates 5a and 5b are alternately arranged at a center position between the high clutch H/C and the transmission casing 1 such that the brake plate 5a is connectable to the transmission casing 1 and the other brake plate 5b is connectable to a hub 6 provided on the third rotatable member M3. Further, the piston 5c is hydraulically operated to engage both brake plates 5a and 5b for moving in the axial direction within chamber 2b provided on the inner face of the side cover 2. In addition, a plurality of arm portions 5e are attached to the piston 5c for pushing against the brake plates 5a and 5b. Between the arm portions 5e, the return spring 5d is provided for applying return force against the pushing of the arm portions 5e. One end of the return spring 5d is installed at the piston 5c while the other end thereof is is seated on a spring seat 5f. A stopper 1a is provided in the transmission casing 1 for regulating movement of the spring seat in the longitudinal direction of the return spring 5d.

Also, the chamber 2b on the inner face of the side cover 2 includes a groove 2c therein corresponding to a projection 5g of the piston 5c for regulating movement of the piston 5c.

Figure 2:
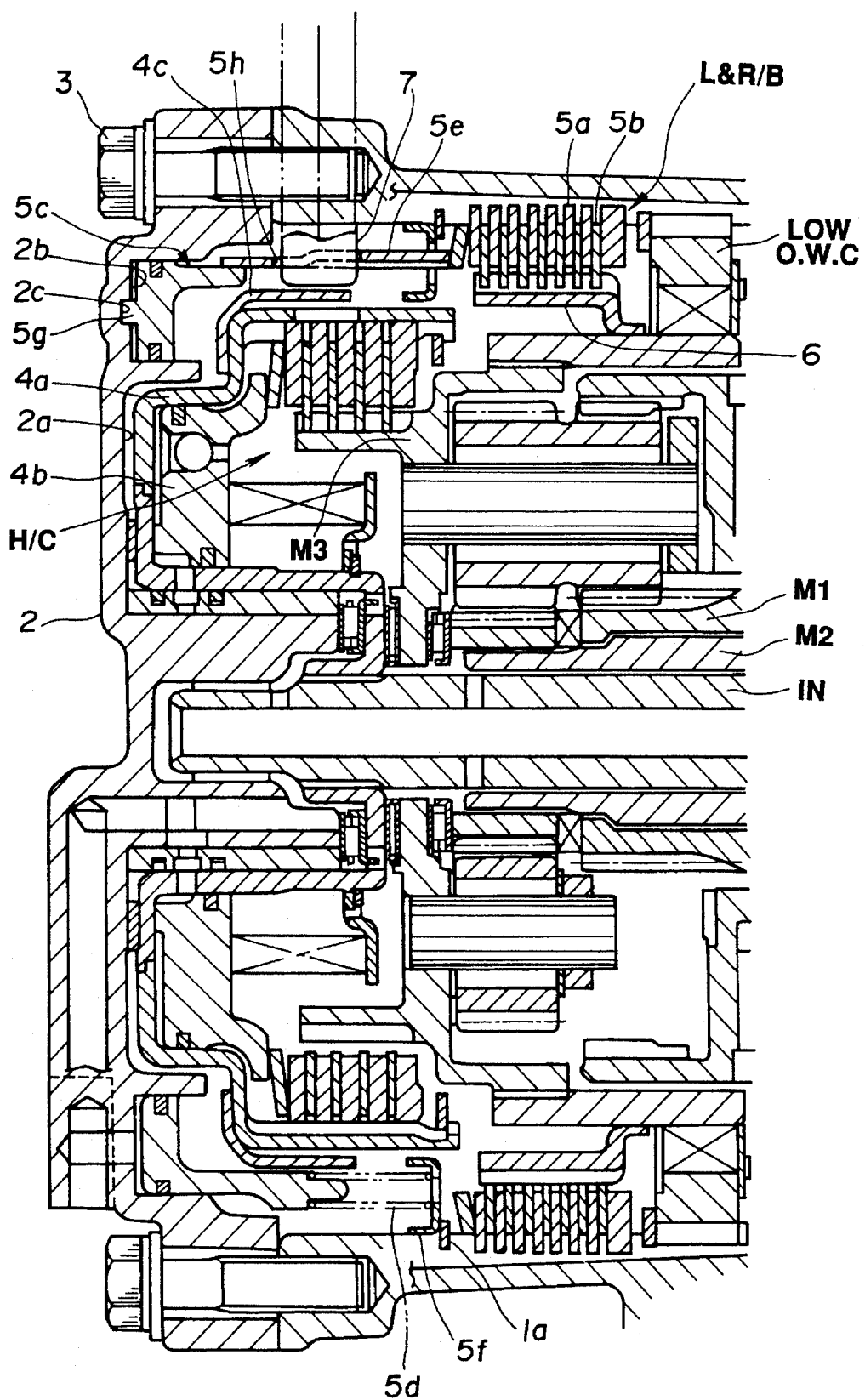
FIG. 2 is a magnified cross-sectional view of a main portion of the transmission of FIG. 1.
Figure 4:
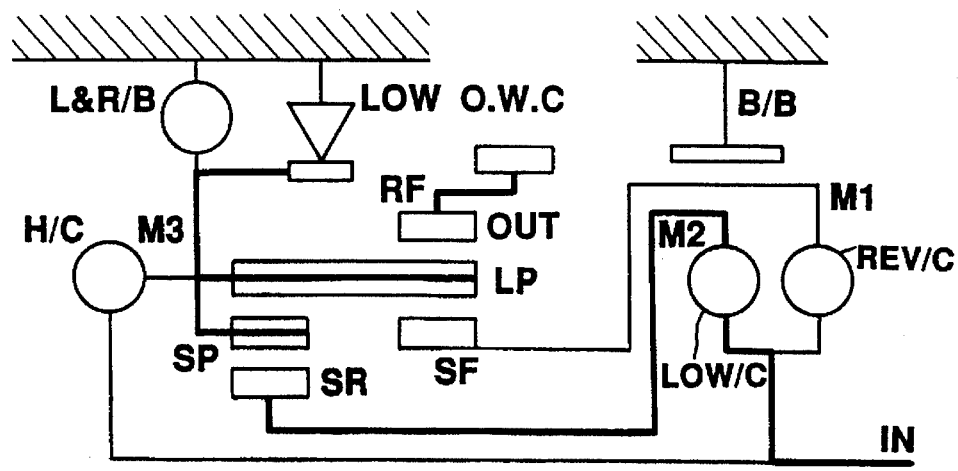
FIG. 4(a) is a schematic diagram showing connection of elements in an automatic transmission according to the invention in a first gear range.
FIG. 4(b) is a graph showing characteristics in the gear range of FIG. 4(a)
Figure 4:
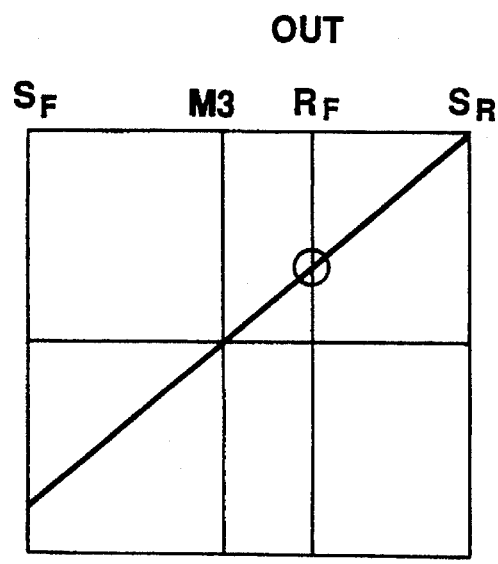
Figure 5:
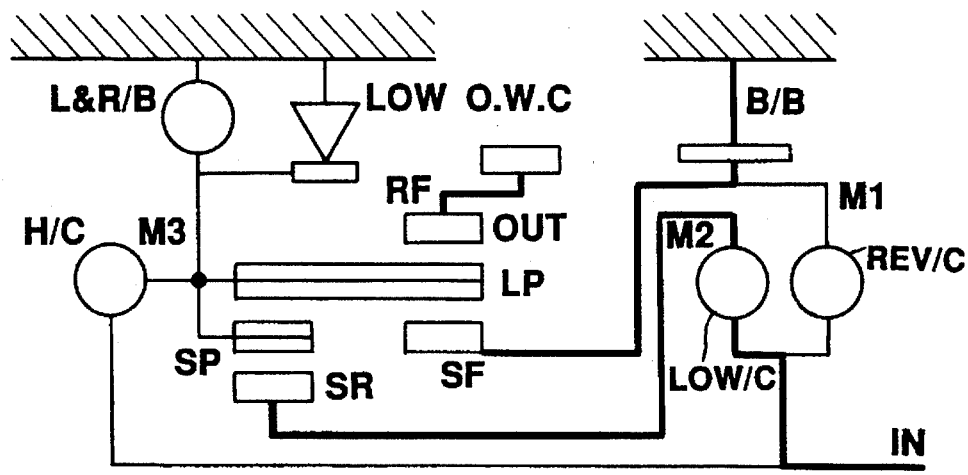
FIG. 5(a) is a schematic diagram showing connection of elements in an automatic transmission according to the invention in a second gear range.
FIG. 5(b) is a graph showing rotational characteristics in the gear range of FIG. 5(a)
Figure 5:
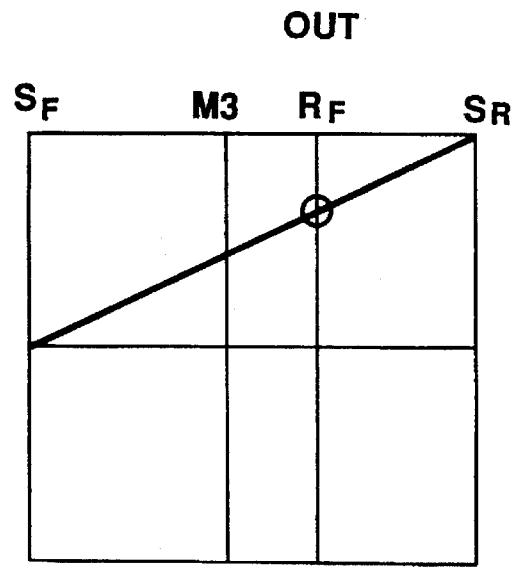
Figure 6:
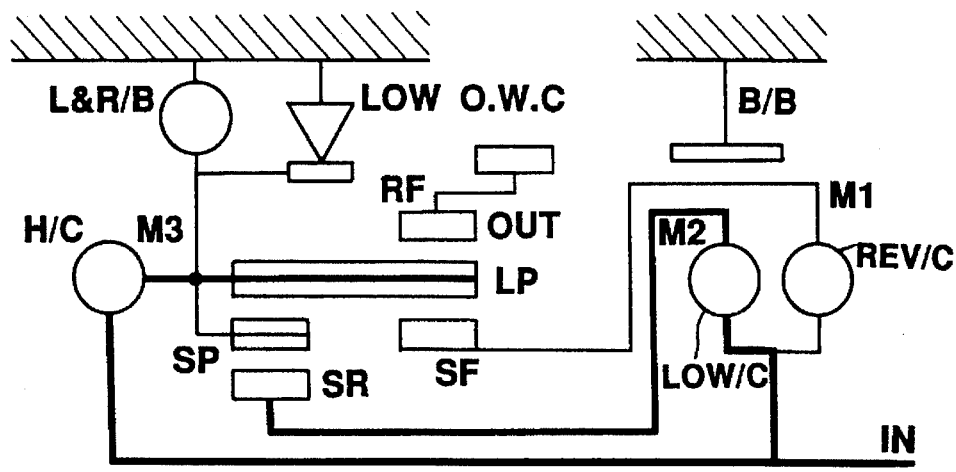
FIG. 6(a) is a schematic diagram showing connection of elements in an automatic transmission according to the invention in a third gear range.
FIG. 6(b) is a graph showing rotational characteristics in the gear range of FIG. 6(a)
Figure 6:
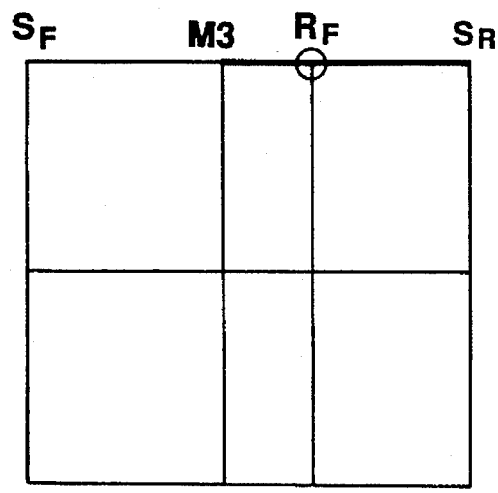
Figure 7:
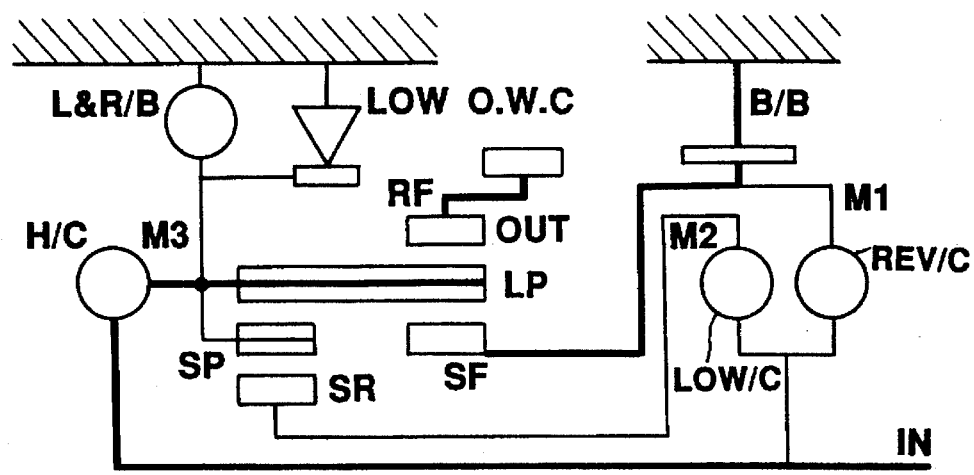
FIG. 7(a) is a schematic diagram showing connection of elements in an automatic transmission according to the invention in a fourth gear range.
FIG. 7(b) is a graph showing rotational characteristics in the gear range of FIG. 7(a)
Figure 7:
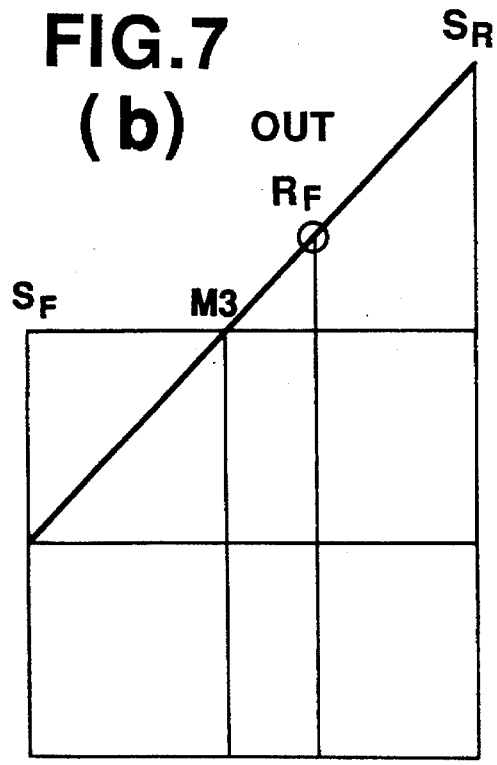
Figure 8:
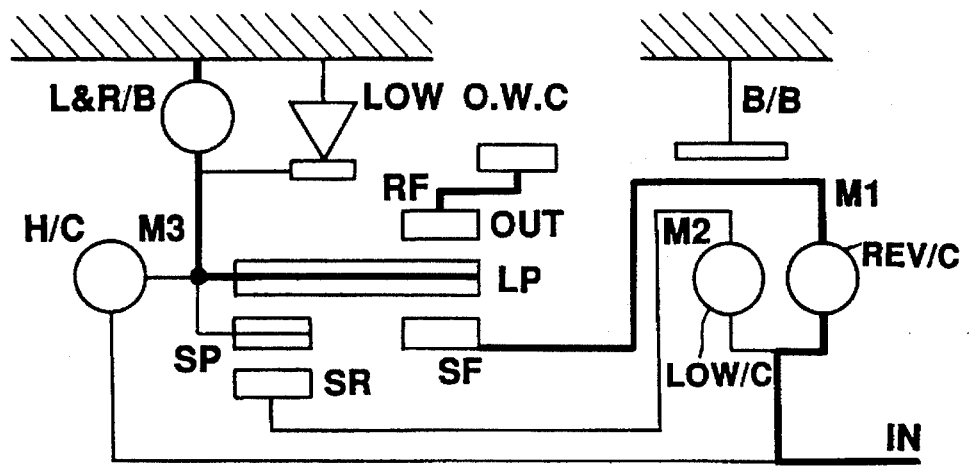
FIG. 8(a) is a schematic diagram showing connection of elements in an automatic transmission according to the invention in a reverse gear range.
FIG. 8(b) is a graph showing rotational characteristics in the gear range of FIG. 8(a).
Figure 8:
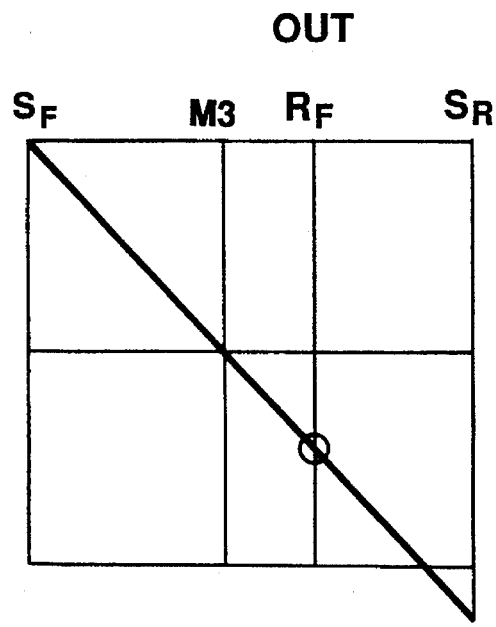

Furthermore, as seen in FIG. 2, a sensor 7 is provided so as to penetrate the transmission casing 1 for detecting a rotational speed of the input shaft IN. The arm portions 5e are provided cutouts 5h for permitting access of the sensor 7. The input shaft IN is connected by splines to the clutch drum 4a of the high clutch H/C. A sensor plate 4c is attached to the clutch drum 4a for detection by the sensor 7. The sensor plate 4c is attached to the outer circumference of the clutch drum 4a in order to give an uneven, or toothed shape to the clutch drum 4a for aiding in rotational detection by the sensor 7.

Hereinbelow, the engagement of elements of an automatic transmission according to the present invention will be explained for each gear range, with reference to FIG. 3.

First, when the transmission is in a first gear range, the low clutch LOW/C is engaged. Also, under acceleration in the first gear range, the low one-way clutch LOW O.W.C is further engaged (shown as a shaded circle in FIG. 3), and an under engine braking condition in the first gear range, the low and reverse brake L&R/B is also engaged (dotted circle in FIG. 3).

In the second gear range of the transmission according to the present invention, the low clutch LOW/C and the band brake B/B are engaged.

In the third gear range of the transmission, the high clutch H/C and the low clutch LOW/C are active.

In the fourth gear range, the high clutch H/C and the band brake B/B are utilized.

Further, in the reverse gear range of the automatic transmission of the invention, the reverse clutch REV/C and the low and reverse brake L&R/B are brought into engagement.

FIGS. 4–8(a) are schematic diagrams outlining the engagement of transmission elements for each of the four gear ranges and the reverse gear range. FIGS. 4–8(b) are graphs showing rotational characteristics of transmission transmission elements and an output rotation thereof.

Hereinbelow, the special features of the automatic transmission of the invention will be enumerated in detail.

1) Since the low and reverse brake L&R/B is provided at an outer periphery of the transmission housing, an axial dimension of the transmission may be substantially reduced. Further, the piston 5c supported by arm portions 5e including a cut-out 5h, is provided in the vicinity of the sensor 7, and includes a projection portion 5g corresponding to a guide groove 2c provided in the chamber 2b at the inner face of the side cover 2, thus, motion of the piston is regulated and interference between the piston 5c, of the low and reverse brake L&R/B, and the sensor 7, does not occur.

2) According to the invention, the low and reverse brake L&R/B is provided radially outward of the high clutch H/C and the support portion 2a, for the clutch drum 4a, and a cylinder chamber 2b, for the piston 5c of the low and reverse brake L&R/B, are provided integrally formed in the inner face of the side cover 2. Further, the plates 5a and 5b of the low and reverse brake L&R/B are provided at a location axially inward of the high clutch H/C. Thus, efficient use of the internal space of the automatic transmission according to the invention is realized and, since the side cover 2 serves additionally as a cylinder chamber 2b and a support portion 2a further reduction in the axial dimension of the transmission can be achieved and manufacturing of the transmission is simplified.

In addition, since the piston 5c of the low and reverse brake L&R/B is provided substantially radially outward of the outer circumference of the high clutch H/C, reduction in the diameter of an automatic transmission according to the invention can be accomplished.

3) Since a vertical wall portion is not required by the structure of the invention for supporting the plates, piston or piston chamber, additional reduction in the axial dimension of an automatic transmission according to the invention can be realized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In an automatic transmission:

a torque converter;

a transmission casing having one end adjacent to said torque converter and the opposite end open, said opposite end being spaced further from said torque converter than said one end is;

a cover attached to said transmission casing to close said opposite end and defining one limit of the automatic transmission, said cover being formed with a support portion opening to the interior of said transmission casing and a cylinder chamber opening to the interior of said transmission casing, said cylinder chamber being disposed radially outward of said support portion;

a clutch arranged in said transmission casing and including a clutch drum having a portion extending into said support portion of said cover and a hydraulically operated clutch piston disposed in said portion of said clutch drum extending into said support portion of said cover; and a brake arranged in said transmission casing, said brake including a set of interleaved plates and a hydraulically operated brake piston received by said cylinder chamber.

2. An automatic transmission as set forth in claim 1, wherein said hydraulically operated brake piston is disposed radially outward of said hydraulically operated clutch piston.

3. An automatic transmission as set forth in claim 2, wherein said hydraulically operated brake piston has a plurality of arm portions disposed radially outward of said clutch drum.

* * * * *